INVENTOR
NELSON E. ANDERSON
BY
ATTORNEY

United States Patent Office 2,745,990
Patented May 15, 1956

2,745,990

ALTERNATING CURRENT ELECTRIC ARC WELDING

Nelson E. Anderson, Berkeley Heights, N. J., assignor to Air Reduction Company, Incorporated, New York, N. Y., a corporation of New York Application December 28, 1951, Serial No. 263,874

1 Claim. (Cl. 315—183)

This invention relates to electric arc welding and more particularly to a method and apparatus for starting and/or stabilizing a welding arc.

The establishment of an electric welding arc depends on making the arc gap conductive, probably through the mechanism of ionizing the atmosphere of the arc gap. The open circuit voltage of conventional welding machines is ordinarily inadequate to make the arc gap conductive, even when the gap is very small. As a result, various expedients have been employed to start the arc. These expedients include touch starting, the use of steel wool balls, the use of carbon rods, and so forth. Another method of starting that has become more popular, particularly with the advent of inert gas-shielded tungsten arc welding, is high frequency starting. In this method a source of high frequency voltage of 1000 volts or more is applied across the arc gap to ionize the atmosphere and start the arc. In addition to assisting in starting the arc, the high frequency discharge maintains the arc gap conductive during current reversal periods in alternating current arc welding, and thereby stabilizes the arc. High frequency starting and stabilization is now well known. High frequency generators of the spark gap type and constant-wave vacuum tube oscillators have both been used and are also well known. I have found further that the high frequency, high voltage need only be applied to the welding circuit long enough to start the arc, and in the case of alternating current arc welding applied additionally only at such times as the arc gap becomes non-conductive during welding current reversals.

Since the high frequency discharge does not affect the welding adversely, the simplest system for high frequency starting and stabilization is one in which the oscillator operates continuously. This, however, has several disadvantages. If the oscillator is to be operated continuously, the circuit components must be much larger and are much more costly than the circuit components of a similar oscillator operating on a short duty cycle. In addition, there is the consideration of reduced maintenance on the short duty cycle oscillator. Also there is a considerable problem caused by radiation from high frequency starting and/or stabilizing equipment. Such radiation interferes with wireless communications. If the use of the high frequency is reduced to the very minimum, the interference may also be reduced.

An object of this invention is to provide a novel method and apparatus for starting and/or stabilizing a welding arc.

Another object of this invention is to provide a welding system, including a high voltage, high frequency generator in which the high frequency generator is operative only when the arc gap is not conductive.

Another object of this invention is to provide an A. C. welding system, including a high frequency generator in which the high frequency generator is operative only when the arc gap does not ignite or reignite when the welding electrode is swinging from negative to positive polarity.

By means of this invention a high frequency starting and/or stabilizing oscillator operates only when the arc gap is not conductive.

Figure 1:
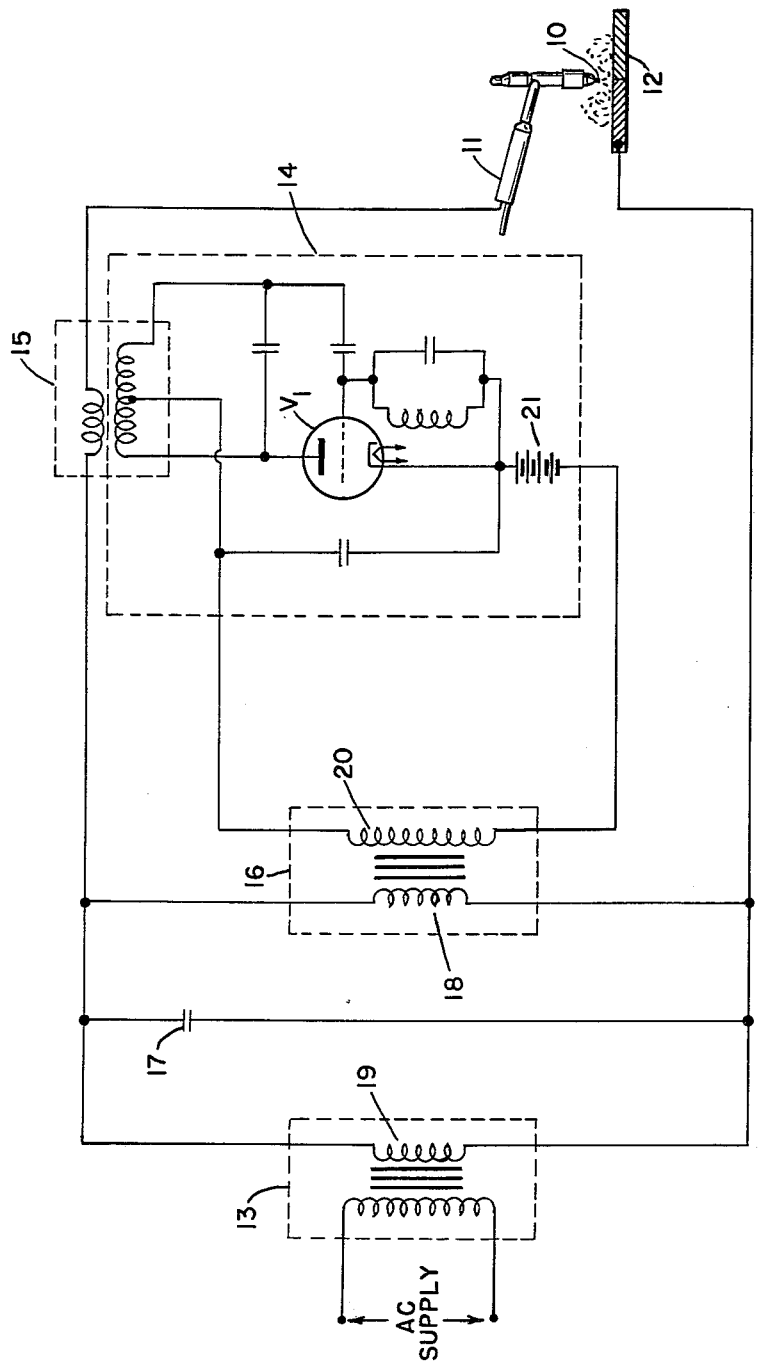
Fig. 1 is a schematic diagram of a welding circuit embodying one form of the present invention.

Referring to Fig. 1 an electrode 10 is held in an electrode holder 11 in operative position with respect to a workpiece 12, i. e., with an arc gap between the electrode and the workpiece. The electrode 10 may be a non-consuming electrode such as a tungsten electrode and the electrode holder 11 may be of the gas shielding type, although the invention is not to be so limited. The electrode 10 and workpiece 12 are in the circuit of a welding machine 13 which is here illustrated as a conventional transformer welder. A high frequency oscillator 14 is represented by the vacuum tube $V_1$ and its associated circuit components, as will be more fully described hereinafter. A coupling transformer 15 couples the output of the oscillator into the welding circuit. A step-up transformer 16 is connected in the circuit across the welding transformer secondary in parallel with the arc and provides control means in the plate circuit of the oscillator tube $V_1$. A capacitor 17 provides a low impedance path for the high frequency around transformers 13 and 16 and a high impedance to the welding current frequency.

Figure 2:
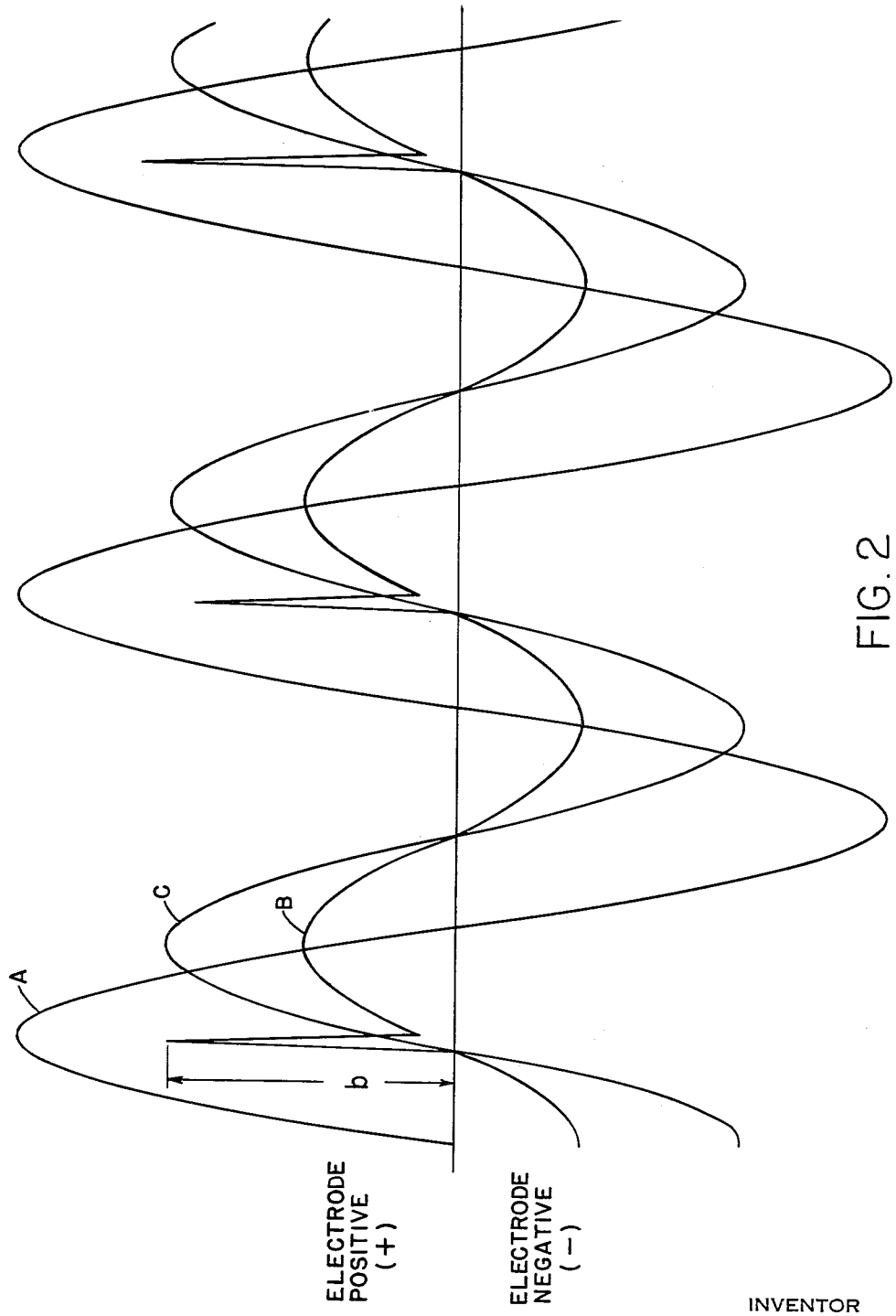
Fig. 2 is a reproduction of an oscillogram showing the open circuit voltage at the electrode, the arc voltage, and the welding current traces superimposed on a common time base.

In order to understand the present invention and the operation of the representative circuit briefly described above, the current and voltage characteristics at the welding arc must be appreciated. Fig. 2 illustrates these electrical conditions. Curve A of Fig. 2 represents the open circuit voltage between the electrode 10 and the workpiece 12. Curve B of Fig. 2 represents the voltage between the electrode 10 and workpiece 12 during welding and in the absence of any stabilizing means. Curve C represents the welding current and its phase relation to the open circuit voltage and arc voltage is evident. The particular oscillogram reproduced in Fig. 2 was made from a conventional 60 cycle argon-shielded welding arc struck between a tungsten electrode and an aluminum workpiece. However, similar oscillograms result from other welding arcs, differing primarily from the one illustrated only by the degree of rectification (lack of symmetry of positive and negative half cycles) and the amount of phase shift. It is significant to note that in Fig. 2 the arc voltage is substantially in phase with the welding current but roughly from about 45° to 80° out of phase with the open circuit voltage. As a result, if when the welding current and voltage pass through zero in the A. C. cycle the arc gap becomes non-conductive, so that the arc does not reignite, open circuit conditions exist. The arc voltage immediately shifts back to its open circuit value and phase relation which means that the voltage goes substantially instantaneously from approximately zero to a value approaching the open circuit peak value. This is denoted by portion $b$ of curve B. The peak open circuit voltage is always greater than the peak welding voltage and generally about three times the peak welding voltage. For the specific operating conditions represented by Fig. 2 the welding voltage is about 35 volts and the peak open circuit voltage is about 105 volts.

It has been discovered, according to the present invention, that these phenomena can be employed to trigger the high frequency oscillator in timed relation to the reversals of the welding current. This is in fact done by the circuit illustrated as follows.

When the primary 18 of step-up transformer 16 is connected across the secondary 19 of the welding transformer 13, the voltage induced in the secondary 20 of step-up transformer 16 will be proportional to the voltage across its primary 18. The high voltage secondary 20 is connected to supply directly the plate of tube $V_1$ of the high frequency oscillator circuit.

The oscillator circuit illustrated is a conventional Hartley oscillator. A bias source 21 prevents conduction of the tube, and hence oscillation, until the plate voltage impressed on the tube from winding 19 exceeds some predetermined minimum. This bias has such a value that the tube draws current, and oscillations occur, only when the voltage impressed thereon by winding 20 exceeds the voltage impressed thereon when the arc gap is ionized and arc current is flowing. Stated in other words, the bias is overcome and the tube $V_1$ conducts and sustains oscillations only when a voltage greater than the peak value of the welding voltage is impressed on primary 18 of transformer 16. This is exactly the condition under which the high voltage, high frequency is required, namely, when the arc gap is non-conductive and its impedance is high and the arc does not ignite or reignite.

It may be seen from Fig. 2 that the arc gap becomes non-conductive as the electrode voltage swings from negative to positive, with the result that the voltage shifts phase and jumps up toward its open circuit value. On the other half cycle, however, there is no evidence of deionization. This is a correct representation of the actual conditions present when welding aluminum with an argon-shielded arc from a tungsten electrode. For this reason a voltage above the normal voltage and sufficient to trigger the oscillator appears across secondary 20 on the one half cycle only. Tube $V_1$ of the oscillator circuit is therefore connected with the correct polarity to conduct on this half cycle. If capacitor 17 acts to attenuate the voltage peak produced at the time of current reversal, a band pass network tuned to the oscillator frequency may be substituted.

For other arc welding conditions where rectification is not so pronounced, the arc gap may become non-conductive on each half cycle, in which case an oscillator circuit may be employed that will fire on either half cycle or both.

Figure 3:
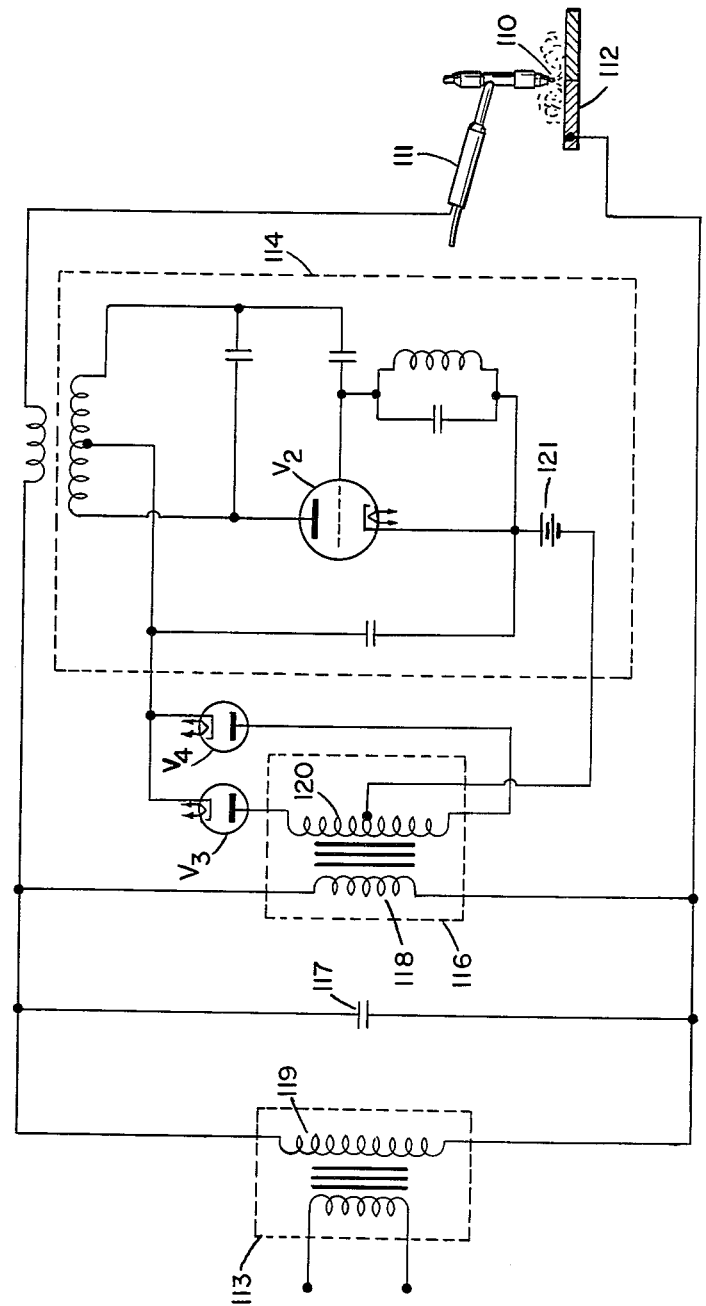
Fig. 3 is a schematic diagram of a welding circuit embodying another form of the present invention.

Such a circuit is illustrated in Fig. 3 in which the components are analogous to the components of Fig. 1. A welding electrode 110 in an electrode holder 111 is shown in operative relation to a workpiece 112. The electrode and workpiece are energized from a welding transformer 113. A step-up transformer 116 has its primary 118 connected in parallel with the arc gap across the secondary 119 of the welding transformer. A capacitor 117, or other tuned network, short circuits the oscillator high frequency around transformers 113 and 116. The oscillator 114 comprises vacuum tube $V_2$ and its associated circuits. The high voltage secondary 120 of step-up transformer 116 is connected through rectifiers $V_3$ and $V_4$ to supply directly the plate of tube $V_2$ of the high frequency oscillator circuit. The oscillator 114 is shown as a conventional Hartley oscillator. A bias source 121 prevents conduction of the tube, and hence oscillation, until the plate voltage impressed on the tube from winding 120 exceeds some predetermined minimum. This bias is made to have a value such that the tube can conduct and oscillations occur only when the voltage across primary 118 of transformer 116 exceeds normal arc voltage. With the circuit illustrated in Fig. 3 the oscillator will function when such a sufficient voltage is reached on either half of the cycle.

This invention is useful for consumable electrode arc welding and for non-consumable electrode arc welding. The term "arc gap" as used herein includes the anode and cathode voltage drop regions as well as the space between the electrode and the work. The invention is not limited to the specific disclosure made herein, but includes the novel and inventive concepts defined by the appended claims.

I claim:

An alternating current arc welding system comprising in a welding circuit a source of welding current, a workpiece and an electrode spaced from said workpiece to form an arc gap between said electrode and said workpiece; an auxiliary high frequency oscillator circuit including a grid controlled electron tube; a tansformer having a primary winding in parallel circuit relation to said arc gap in said welding circuit and a secondary winding in the circuit of said oscillator to apply a voltage across the plate and cathode of said electron tube to cause said tube to conduct and thereby produce oscillation in said oscillator circuit when the voltage applied between the plate and cathode of said electron tube exceeds the peak value of that applied thereto when the arc gap is conductive, and bias means in circuit with said electron tube to cause said tube to be non-conductive when the voltage applied thereto from said transformer secondary does not exceed the peak value applied thereto when said arc gap is conductive; and a coupling transformer having a secondary winding in said welding circuit and a primary winding in said oscillator circuit to couple the output of said oscillator into said welding circuit.

References Cited in the file of this patent

UNITED STATES PATENTS

| | | |
|---|---|---|
| 2,151,786 | Maybury | Mar. 28, 1939 |
| 2,470,668 | White | May 17, 1949 |
| 2,482,473 | Fromm | Sept. 20, 1949 |
| 2,516,016 | Pakala | July 18, 1950 |
| 2,588,102 | Roberts | June 26, 1951 |
| 2,561,995 | Roberts | July 24, 1951 |
| 2,599,281 | Potter | June 3, 1952 |

FOREIGN PATENTS

| | | |
|---|---|---|
| 948,468 | France | Aug. 2, 1949 |